United States Patent
Ishino

(10) Patent No.: US 9,018,289 B2
(45) Date of Patent: Apr. 28, 2015

(54) RUBBER COMPOSITION FOR TREAD AND PNEUMATIC TIRE

(75) Inventor: Soh Ishino, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 122 days.

(21) Appl. No.: 12/977,124

(22) Filed: Dec. 23, 2010

(65) Prior Publication Data

US 2011/0160337 A1 Jun. 30, 2011

(30) Foreign Application Priority Data

Dec. 25, 2009 (JP) ................................ 2009-294680

(51) Int. Cl.
| | |
|---|---|
| *C08K 5/548* | (2006.01) |
| *C08L 9/00* | (2006.01) |
| *B60C 1/00* | (2006.01) |
| *C08L 9/06* | (2006.01) |
| *C08L 21/00* | (2006.01) |

(52) U.S. Cl.
CPC ................ *C08L 9/00* (2013.01); *B60C 1/0016* (2013.04); *C08L 9/06* (2013.01); *C08L 21/00* (2013.01)

(58) Field of Classification Search
USPC ........................................... 524/262
See application file for complete search history.

(56) References Cited

U.S. PATENT DOCUMENTS

| | | | | |
|---|---|---|---|---|
| 2006/0192483 A1* | 8/2006 | Nakanishi et al. | ............. | 313/504 |
| 2007/0197812 A1* | 8/2007 | Chaves et al. | ................ | 556/427 |
| 2008/0194748 A1 | 8/2008 | Futamura | | |
| 2008/0314484 A1* | 12/2008 | Nishioka et al. | ............. | 152/209.1 |
| 2011/0230625 A1* | 9/2011 | Kurachi et al. | ................ | 525/439 |
| 2013/0090445 A1* | 4/2013 | Hattori et al. | ................ | 526/340 |

FOREIGN PATENT DOCUMENTS

| | | |
|---|---|---|
| CN | 101328289 A | 12/2008 |
| EP | 1 535 959 A2 | 6/2005 |
| EP | 1 647 572 A1 | 4/2006 |
| EP | 1 770 122 A2 | 4/2007 |
| EP | 2 014 711 A2 | 1/2009 |
| EP | 2 128 186 A1 | 12/2009 |
| JP | 2002-363346 A | 12/2002 |
| JP | 2005-325206 A | 11/2005 |
| JP | 2009-001720 A | 1/2009 |
| JP | 2009-126907 A | 6/2009 |
| JP | 2009-263420 A | 11/2009 |

* cited by examiner

*Primary Examiner* — Kuo-Liang Peng
(74) *Attorney, Agent, or Firm* — Birch, Stewart, Kolasch & Birch, LLP

(57) ABSTRACT

It is an object of the present invention to provide: a rubber composition for a tread, which improves processability, rolling resistance, wet skid performance, abrasion resistance, and handling stability in good balance; and a pneumatic tire having a tread produced from the rubber composition. The present invention relates to a rubber composition for a tread, including: a rubber component; an aromatic vinyl polymer; silica; and a mercapto group-containing silane coupling agent, wherein the aromatic vinyl polymer is a resin obtained by polymerization of α-methylstyrene and/or styrene, and the amount of the aromatic vinyl polymer is 3 to 25 parts by mass, and the amount of the silica is 15 to 150 parts by mass, based on 100 parts by mass of the rubber component.

8 Claims, No Drawings

RUBBER COMPOSITION FOR TREAD AND PNEUMATIC TIRE

TECHNICAL FIELD

The present invention relates to a rubber composition for a tread and a pneumatic tire having a tread produced therefrom.

BACKGROUND ART

Conventionally, fuel consumption of vehicles has been improved by reducing rolling resistance (i.e. improving rolling resistance) of tires. Further reduction in fuel consumption of vehicles has been more and more strongly required in recent years, and a rubber composition for producing a tread, which occupies a larger portion of a tire among various tire components, is required to be excellent in rolling resistance.

Known as a method of improving rolling resistance of a rubber composition is a method in which the amount of a reinforcing filler in the rubber composition is reduced. However, this method causes reduction in hardness of the rubber composition, which problematically results in deterioration in handling stability and wet skid performance of tires.

Known as a method for solving such problems is a method in which silica is used as a reinforcing filler. Since silica has low affinity for a rubber component, silica is usually used in combination with silane coupling agents such as sulfide silanes and mercapto silanes. Patent Document 1, for example, discloses a rubber composition containing bis(3-triethoxysilylpropyl)tetrasulfide.

However, the use of the sulfide silanes tends to increase viscosity upon processing thereof, and the use of the mercapto silanes tends to reduce scorch time. Thus, the conventional silane coupling agents are required to be improved because processability of the rubber composition tends to be deteriorated. In addition, the method using silica requires an improvement because abrasion resistance tends not to be sufficiently improved due to lower reinforcing properties of silica than those of other reinforcing fillers such as carbon black.

Patent Document 1: JP 2002-363346 A

SUMMARY OF THE INVENTION

It is an object of the present invention to provide: a rubber composition for a tread that improves processability, rolling resistance, wet skid performance, abrasion resistance, and handling stability in good balance so as to solve the above problems; and a pneumatic tire having a tread produced from the rubber composition.

The present invention relates to a rubber composition for a tread, including: a rubber component; an aromatic vinyl polymer; silica; and a mercapto group-containing silane coupling agent, wherein the aromatic vinyl polymer is a resin obtained by polymerization of α-methylstyrene and/or styrene, and the amount of the aromatic vinyl polymer is 3 to 25 parts by mass, and the amount of the silica is 15 to 150 parts by mass, based on 100 parts by mass of the rubber component.

The aromatic vinyl polymer is desirably a homopolymer of α-methylstyrene or a copolymer of α-methylstyrene and styrene.

It is desirable that the mercapto group-containing silane coupling agent is a copolymer including units A represented by formula (1) and units B represented by formula (2), and the proportion of the units B is 1 to 70 mol % of the total molar amount of the units A and the units B.

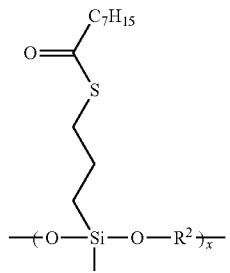

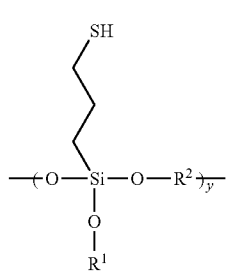

In formulae (1) and (2), x and y each are an integer of one or more, $R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing the end of the alkyl or alkenyl group with a hydroxy or carboxyl group, $R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^1$ and $R^2$ may form a ring structure together.

The aromatic vinyl polymer desirably has a softening point of 100° C. or lower.

The rubber component desirably includes a styrene butadiene rubber together with a butadiene rubber or a natural rubber.

The present invention also relates to a pneumatic tire having a tread produced from the rubber composition.

The rubber composition according to the present invention contains a specific aromatic vinyl polymer and a mercapto group-containing silane coupling agent in addition to a silica-containing composition. Use of this rubber composition for a tread provides a pneumatic tire that has good balance between processability, rolling resistance, wet skid performance, abrasion resistance, and handling stability.

BEST MODE FOR CARRYING OUT THE INVENTION

The rubber composition for a tread of the present invention contains predetermined amounts of a specific aromatic vinyl polymer and silica, and also contains a mercapto group-containing silane coupling agent. The rubber composition containing the aromatic vinyl polymer improves handling stability and wet skid performance. In the case of using the mercapto group-containing silane coupling agent, scorch time tends to be reduced; however, the use of the aromatic vinyl polymer according to the present invention combats this tendency and also can improve kneading processability and the processability in extrusion. In addition, the combined use of the aromatic vinyl polymer, the silica, and the silane coupling agent improves rolling resistance while maintaining processability, and simultaneously improves abrasion resistance. Thus, performances (especially abrasion resistance, wet skid performance, and rolling resistance) that have conventionally been difficult to achieve simultaneously are improved in good balance.

The rubber component used for the rubber composition of the present invention is not particularly limited.

Examples thereof include diene rubbers such as natural rubber (NR), isoprene rubber (IR), butadiene rubber (BR), styrene butadiene rubber (SBR), acrylonitrile butadiene rubber (NBR), chloroprene rubber (CR), butyl rubber (IIR), halogenated butyl rubber (X-IIR), and styrene-isoprene-butadiene copolymer rubber (SIBR). These may be used alone, or two or more kinds thereof may be used in combination. Desirable among these is SBR because it achieves rolling resistance and wet skid performance in good balance. The combined use of SBR and BR is more desirable because it further achieves abrasion resistance in good balance.

The SBR is not particularly limited. Examples thereof include ones generally used in the tire industry, such as emulsion-polymerized styrene butadiene rubber (E-SBR) and solution-polymerized styrene butadiene rubber (S-SBR). Terminally-modified SBR (modified SBR) may be suitably used because it is particularly excellent in adhesion to silica and further reduces rolling resistance. Examples of the modified SBR include ones modified with an alkoxy group-containing organosilicon compound as disclosed in JP 2001-114938 A, for instance.

The styrene content of the SBR is desirably 5% by mass or more, and more desirably 15% by mass or more. The SBR with a styrene content of less than 5% by mass may not provide sufficient grip performance if used for a cap tread.

The styrene content of the SBR is desirably 60% by mass or less, and more desirably 45% by mass or less. If the styrene content exceeds 60% by mass, the compatibility of the SBR with BR or NR may be deteriorated, the hardness of the rubber composition may increase excessively, and the abrasion resistance and rolling resistance may be deteriorated.

The styrene content used herein is measured by $H^1$-NMR measurement.

The amount of the SBR in 100% by mass of the rubber component is desirably 10% by mass or more, more desirably 25% by mass or more, and further desirably 40% by mass or more. The SBR in an amount of less than 10% by mass may not provide sufficient grip performance. The amount of the SBR may be 100% by mass, and is desirably 90% by mass or less, and more desirably 70% by mass or less. The SBR in an amount exceeding 90% by mass may deteriorate rolling resistance. In addition, the relative blending proportion of other rubbers such as BR and NR decreases, which may lead to deterioration in abrasion resistance and processability.

The BR is not particularly limited. Examples thereof include BRs with a high cis-content such as BR1220 (produced by ZEON Corporation), and BR130B and BR150B (each produced by Ube Industries, Ltd.); and syndiotactic polybutadiene crystal-containing BRs such as VCR412 and VCR617 (each produced by Ube Industries, Ltd.). BRs with a cis content of 10% by mass or more are desirable among these. However, BRs with an excessively high cis-content may be difficult to synthesize and their crystallinity may be too high to process them easily.

The amount of the BR in 100% by mass of the rubber component is desirably 10% by mass or more, more desirably 25% by mass or more, and further desirably 40% by mass or more. If the amount is less than 10% by mass, neither abrasion resistance nor rolling resistance may be sufficiently improved. The amount may be 100% by mass, and is desirably 80% by mass or less, more desirably 70% by mass or less, and further desirably 60% by mass or less. When used for a cap tread, the BR in an amount exceeding 80% by mass may make it difficult to provide the required wet grip performance and make it difficult for rubbers other than the BR to improve performances.

The rubber composition of the present invention contains a specific aromatic vinyl polymer, that is, a resin obtained by polymerization of α-methylstyrene and/or styrene. It is noted that the aromatic vinyl polymer is not included in the rubber component.

In the aromatic vinyl polymer, styrene and/or α-methylstyrene are used as an aromatic vinyl monomer (unit), and the aromatic vinyl polymer may be either a homopolymer of each of the monomers or a copolymer of both of the monomers. As the aromatic vinyl polymer, a homopolymer of α-methylstyrene, or a copolymer of α-methylstyrene and styrene is desirable because of its higher economy, easy processability and excellent wet skid performance.

The softening point of the aromatic vinyl polymer is desirably 100° C. or lower, more desirably 92° C. or lower, and further desirably 88° C. or lower. If the softening point exceeds 100° C., abrasion resistance and the grip performance at low temperatures tend to be deteriorated. The softening point is desirably 30° C. or higher, more desirably 60° C. or higher, and further desirably 75° C. or higher. If the softening point is lower than 30° C., wet skid performance tends to be deteriorated.

The softening point used herein refers to a temperature at which a ball drops in measurement with a ring and ball softening point measuring apparatus according to JIS K6220.

The weight-average molecular weight (Mw) of the aromatic vinyl polymer is desirably 500 or more, and more desirably 800 or more. If the Mw is less than 500, rolling resistance and wet skid performance tend not to be sufficiently improved. The Mw of the aromatic vinyl polymer is desirably 3000 or less, and more desirably 2000 or less. If the Mw exceeds 3000, rolling resistance tends to be deteriorated.

The Mw used herein is measured with a gel permeation chromatograph (GPC) (GPC-8000 series produced by Tosoh Corporation, detector: differential refractometer, column: TSKGEL SUPERMULTIPORE HZ-M produced by Tosoh Corporation) and calibrated with polystyrene standards.

The amount of the aromatic vinyl polymer is 3 parts by mass or more, desirably 5 parts by mass or more, and more desirably 7 parts by mass or more, based on 100 parts by mass of the rubber component. If the amount is less than 3 parts by mass, wet skid performance tends not to be sufficiently improved. The amount of the aromatic vinyl polymer is 25 parts by mass or less, desirably 20 parts by mass or less, and more desirably 15 parts by mass or less, based on 100 parts by mass of the rubber component. If the amount exceeds 25 parts by mass, rolling resistance and abrasion resistance tend to be deteriorated.

The rubber composition of the present invention contains silica. Example of the usable silica include, but not particularly limited to, one produced by a wet method and one produced by a dry method. These kinds of silica may be used alone, or two or more kinds thereof may be used in combination.

The nitrogen adsorption specific surface area ($N_2SA$) of the silica is desirably 80 $m^2/g$ or more, more desirably 100 $m^2/g$ or more, and further desirably 120 $m^2/g$ or more. If the $N_2SA$ is less than 80 $m^2/g$, the silica reinforcement may be reduced. The $N_2SA$ of the silica is desirably 250 $m^2/g$ or less, more desirably 220 $m^2/g$ or less, and further desirably 200 m²/g or less. If the $N_2SA$ is more than 250 m²/g, the silica tends to be poorly dispersed. As a result, hysteresis loss tends to increase, and rolling resistance tends to be deteriorated.

The $N_2SA$ of the silica is determined by the BET method in accordance with ASTM D3037-81.

The amount of the silica is 15 parts by mass or more, desirably 20 parts by mass or more, more desirably 30 parts by mass or more, and further desirably 40 parts by mass or more, based on 100 parts by mass of the rubber component. If the amount is less than 15 parts by mass, the amount of carbon black needs to be increased, which is not desirable from the viewpoint of rolling resistance. The amount of the silica is 150 parts by mass or less, desirably 120 parts by mass or less, and more desirably 100 parts by mass or less, based on 100 parts by mass of the rubber component. If the amount exceeds 150 parts by mass, the silica is difficult to disperse, and processability tends to be deteriorated. In addition, rolling resistance tends to be deteriorated.

The rubber composition of the present invention contains a mercapto group-containing silane coupling agent.

The mercapto group-containing silane coupling agent is not particularly limited. Examples thereof include 3-mercaptopropyltrimethoxysilane, 3-mercaptopropyltriethoxysilane, 2-mercaptoethyltrimethoxysilane, and 2-mercaptoethyltriethoxysilane.

Among the mercapto group-containing silane coupling agents, suitably used is a copolymer including units A represented by formula (1) and units B represented by formula (2), in which the proportion of the units B is 1 to 70 mol % of the total molar amount of the units A and the units B. In this case, the effects of the present invention can be favorably exhibited.

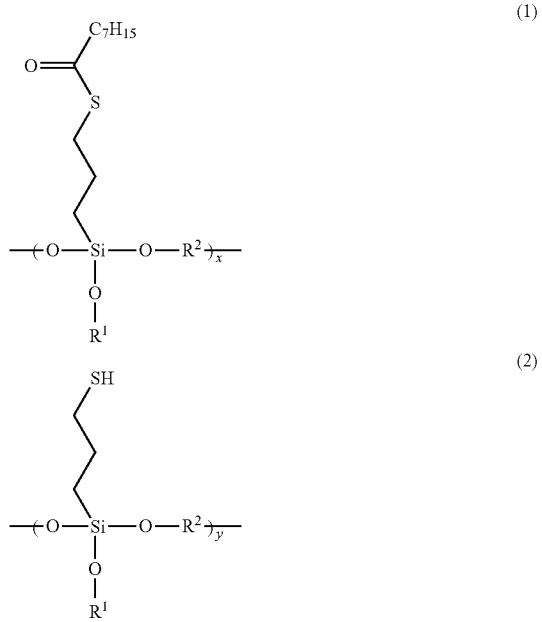

In formulae (1) and (2), x and y each are an integer of one or more, $R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing the end of the alkyl or alkenyl group with a hydroxy or carboxyl group, $R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^1$ and $R^2$ may form a ring structure together.

In the silane coupling agent having such a structure, the molar ratio of the unit A and the unit B satisfies the above condition. Thus, the silane coupling agent suppresses an increase in viscosity during processing in comparison with polysulfide silanes such as bis-(3-triethoxysilylpropyl)tetrasulfide. This is presumably for the following reason. Since the sulfide portion of the unit A is a C—S—C bond, the sulfide portion is thermally stable compared with tetrasulfide or disulfide. Accordingly, an increase in Mooney viscosity is small.

In the case where the molar ratio of the unit A and the unit B satisfies the condition, the silane coupling agent suppresses a reduction in scorch time in comparison with mercaptosilanes such as 3-mercaptopropyltrimethoxysilane. This is presumably for the following reason. The unit B has a mercaptosilane structure, and the —$C_7H_{15}$ portion of the unit A covers the —SH group of the unit B. Accordingly, the —SH group is less likely to react with polymers, and scorching is less likely to occur.

Examples of the halogen for $R^1$ include chlorine, bromine, and fluorine.

Examples of the branched or unbranched $C_{1-30}$ alkyl group for $R^1$ and $R^2$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The number of carbons of the alkyl group is desirably 1 to 12.

Examples of the branched or unbranched $C_{1-30}$ alkylene group for $R^1$ and $R^2$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The number of carbons of the alkylene group is desirably 1 to 12.

Examples of the branched or unbranched $C_{2-30}$ alkenyl group for $R^1$ and $R^2$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The number of carbons of the alkenyl group is desirably 2 to 12.

Examples of the branched or unbranched $C_{2-30}$ alkenylene group for $R^1$ and $R^2$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The number of carbons of the alkenylene group is desirably 2 to 12.

Examples of the branched or unbranched $C_{2-30}$ alkynyl group for $R^1$ and $R^2$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The number of carbons of the alkynyl group is desirably 2 to 12.

Examples of the branched or unbranched $C_{2-30}$ alkynylene group for $R^1$ and $R^2$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The number of carbons of the alkynylene group is desirably 2 to 12.

In the silane coupling agent having the above structure, the total number of repetition (x+y) of the number of repetition (x) of the unit A and the number of repetition (y) of the unit B is desirably 3 to 300. If the total number is within such a range, the —C$_7$H$_{15}$ of the unit A covers the mercaptosilane of the unit B. Accordingly, the reduction in scorch time can be suppressed, and simultaneously, good reactivity with silica and a rubber component can be secured.

Examples of the silane coupling agent having the above structure include NXT-Z30, NXT-Z45, and NXT-Z60, all produced by Momentive Performance Materials. These may be used alone, or two or more kinds thereof may be used in combination.

The amount of the mercapto group-containing silane coupling agent is desirably 1.5 parts by mass or more, and more desirably 2.5 parts by mass or more, based on 100 parts by mass of the silica. If the amount is less than 1.5 parts by mass, the silica tends to be poorly dispersed, and rolling resistance tends to be deteriorated. The amount is desirably 20 parts by mass or less, more desirably 15 parts by mass or less, and further desirably 10 parts by mass or less, based on 100 parts by mass of the silica. If the amount exceeds 20 parts by mass, the effects tend not to correspond to a cost increase. In addition, scorch time tends to be reduced, and processability in kneading and extrusion tends to be deteriorated.

The rubber composition of the present invention desirably contains carbon black in order to provide reinforcing effects and improve properties such as abrasion resistance. Examples of the usable carbon black include, but not particularly limited to, GPF, FEF, HAF, ISAF, and SAF.

The N$_2$SA of the carbon black is desirably 20 m$^2$/g or more, and more desirably 35 m$^2$/g or more. If the N$_2$SA is less than 20 m$^2$/g, sufficient reinforcement and conductivity are less likely to be obtained. The N$_2$SA of the carbon black is desirably 1400 m$^2$/g or less, and more desirably 200 m$^2$/g or less. If the N$_2$SA is more than 1400 m$^2$/g, the carbon black is less likely to be suitably dispersed.

The N$_2$SA of the carbon black is determined by the A method in accordance with JIS K6217.

The amount of the carbon black is desirably 3 parts by mass or more, and more desirably 5 parts by mass or more, based on 100 parts by mass of the rubber component. If the amount is less than 3 parts by mass, weather resistance may not be sufficiently improved, and tires may not be sufficiently colored. The amount of the carbon black is desirably 100 parts by mass or less, more desirably 50 parts by mass or less, and further desirably 30 parts by mass or less, based on 100 parts by mass of the rubber component. If the amount exceeds 100 parts by mass, rolling resistance tends to be deteriorated.

The rubber composition of the present invention may further contain other additives as appropriate, in addition to the aforementioned ingredients. Examples of the additives include oils, tackifiers, antioxidants, antiozonants, age resistors, vulcanizing agents, vulcanization accelerators, and vulcanization accelerator aids.

The rubber composition of the present invention may be produced by a usual method. More specifically, for example, the rubber composition is produced by a method including kneading the aforementioned ingredients with a kneading apparatus such as a Banbury mixer, a kneader, or an open roll mill, and then vulcanizing the resultant mixture.

The rubber composition of the present invention is used for a tread of a pneumatic tire. The method for producing the tread is not particularly limited. For example, the tread may be produced by laminating rubber composition sheets into a predetermined shape, or by introducing a rubber composition into two or more extruders to form a sheet including two or more layers at the head exit of the extruders.

The pneumatic tire of the present invention may be produced by a common method with the above rubber composition. More specifically, an unvulcanized rubber composition containing the aforementioned ingredients is extruded and processed into a shape of a tread, and then molded with other tire components in a usual manner on a tire building machine to form an unvulcanized tire. Then, the unvulcanized tire is heated and pressurized in a vulcanizer to produce the pneumatic tire of the present invention.

EXAMPLES

The present invention is more specifically described based on examples, and the present invention is not limited to these examples.

In the following, the respective chemical agents used in Examples and Comparative Examples are listed.

SBR: ASAPRENE Y031 produced by Asahi Kasei Corporation (styrene content: 26% by mass)

BR: BR150B produced by Ube Industries, Ltd.

Carbon black: SHOBLACK N220 produced by Cabot Japan K.K. (nitrogen adsorption specific surface area (N$_2$SA): 125 m$^2$/g)

Silica: Ultrasil VN3 produced by Degussa AG (N$_2$SA: 175 m$^2$/g, average primary particle size: 15 nm)

Silane coupling agent (Si266): Si266 produced by Degussa AG (bis(3-triethoxysilylpropyl)disulfide)

Silane coupling agent (NXTZ45): NXT-Z45 produced by Momentive Performance Materials (copolymer of unit A and unit B (unit A: 55 mol %, unit B: 45 mol %))

Aromatic vinyl polymer: SYLVARES SA85 produced by Arizona Chemical (copolymer of α-methylstyrene and styrene, softening point: 85° C., Mw: 1000)

Mineral oil: PS-32 produced by Idemitsu Kosan Co., Ltd. (paraffinic process oil)

Zinc oxide: zinc oxide #2 produced by Mitsui Mining & Smelting Co., Ltd.

Stearic acid: "Tsubaki" produced by NOF Corporation

Age resistor: age resistor 6C (SANTOFLEX 6PPD) produced by FLEXSYS

Wax: Sunnoc N produced by Ouchi Shinko Chemical Industrial Co., Ltd.

Sulfur: sulfur powder produced by Tsurumi Chemical Industry Co., Ltd.

Vulcanization accelerator CZ: Nocceler CZ produced by Ouchi Shinko Chemical Industrial Co., Ltd. (N-cyclohexyl-2-benzothiazolyl sulfenamide)

Vulcanization accelerator DPG: Nocceler D produced by Ouchi Shinko Chemical Industrial Co., Ltd. (N,N'-diphenylguanidine)

Examples 1 and 2 and Comparative Examples 1 to 8

According to the formulations shown in Table 1, materials other than the sulfur and the vulcanization accelerators were kneaded with a Banbury mixer at 150° C. for 5 minutes to form a kneaded mass. Thereafter, the sulfur and the vulcanization accelerators were kneaded into the kneaded mass with an open two-roll mill at 50° C. for 5 minutes, whereby an unvulcanized rubber composition was produced.

The resulting unvulcanized rubber composition was rolled into a sheet shape having a thickness of about 2 mm and then processed into a tread shape, and assembled with other tire components to form an unvulcanized tire. Then, the unvulcanized tire was vulcanized at 170° C. for 15 minutes to provide a test tire (tire size: 195/65R15).

The produced unvulcanized rubber compositions and test tires were evaluated as follows. Table 1 shows the results.

<Rubber Composition>
(Mooney Viscosity Index)

The Mooney viscosity ($ML_{1+4}/130°$ C.) of each unvulcanized rubber composition was determined in accordance with JIS K6300-1 "Rubber, unvulcanized—Physical property—Part 1: Determination of Mooney viscosity and pre-vulcanization characteristics with Mooney viscometer". That is, a Mooney viscosity tester was preheated for 1 minute up to 130° C. and a small rotor was rotated under this temperature condition. After 4 minutes of rotation, the Mooney viscosity was determined. Based on the following equation, the measurement result of each formulation was expressed as an index value relative to the Mooney viscosity of Comparative Example 1 regarded as 100. The larger the index value is, the lower the Mooney viscosity is, and the better the processability is.

(Mooney viscosity index)=(Mooney viscosity of Comparative Example 1)/(Mooney viscosity of each formulation)×100

(Scorch Time Index)

The time ($T_{10}$) required for the vulcanization degree of the unvulcanized rubber composition to reach 10% at 160° C. was measured in accordance with JIS K6300. Based on the following equation, the measurement result of each formulation was expressed as an index value relative to the $T_{10}$ of Comparative Example 1 regarded as 100. The larger the index value is, the better the processability is.

(Scorch time index)=($T_{10}$ of each formulation)/($T_{10}$ of Comparative Example 1)×100

(Rolling Resistance Index)

Using a rolling resistance tester, the rolling resistance of each produced test tire was determined under the running conditions of: a rim of 15×6JJ, an internal pressure of 230 kPa, a load of 3.43 kN, and a speed of 80 km/h. Based on the following equation, the measurement result of each formulation was expressed as an index value relative to the rolling resistance of Comparative Example 1 regarded as 100. The smaller the index value is, the better the rolling resistance is (the lower the rolling resistance is).

(Rolling resistance index)=(Rolling resistance of each formulation)/(Rolling resistance of Comparative Example 1)×100

(Wet Skid Performance Index)

The test tires were mounted on all wheels of an FF car (2000 cc) made in Japan. The braking distance was measured which was a distance required for the car to stop after the brakes were applied at 100 km/h on a wet asphalt road surface. The braking distance of Comparative Example 1 was regarded as 100, and the wet skid performance of each formulation was expressed as an index value by the following equation. The larger the index value is, the better the wet skid performance is.

(Wet skid performance index)=(Braking distance of Comparative Example 1)/(Braking distance of each formulation)×100

(Abrasion Resistance Index)

The test tires were mounted on all wheels of an FF car (2000 cc) made in Japan, and the decrease in the depth of pattern grooves was measured after the car had run about 30000 km in a test course. Based on the following equation, the measurement result of each formulation was expressed as an index value relative to the decrease in Comparative Example 1 regarded as 100. The larger the index value is, the better the abrasion resistance is.

(Abrasion resistance index)=(Decrease in Comparative Example 1)/(Decrease in each formulation)×100

(Handling Stability Index)

The test tires were mounted on a car, and the car was run. The handling stability was evaluated by a feeling test of handling responsiveness, rigidity, and grip conducted by test drivers. The evaluation was made on a 10-point scale (higher score is better), and the average value of scores evaluated by the test drivers was calculated. Based on the following equation, the average value of scores of each formulation was expressed as an index value relative to the handling stability index of Comparative Example 1 regarded as 100. The larger the index value is, the better the handling stability is.

(Handling stability index)=(Average value of scores of each formulation)/(Average value of scores of Comparative Example 1)×100

TABLE 1

|  | Comparative Example 1 | Comparative Example 2 | Comparative Example 3 | Comparative Example 4 | Comparative Example 5 | Comparative Example 6 | Example 1 | Example 2 | Comparative Example 7 | Comparative Example 8 |
|---|---|---|---|---|---|---|---|---|---|---|
| SBR | 80 | 80 | 80 | 80 | 80 | 80 | 80 | 80 | 80 | 80 |
| BR | 20 | 20 | 20 | 20 | 20 | 20 | 20 | 20 | 20 | 20 |
| Carbon black | 10 | 10 | 10 | 10 | 10 | 10 | 10 | 10 | 10 | 10 |
| Silica | 80 | 80 | 80 | 80 | 80 | 80 | 80 | 80 | 80 | 80 |
| Silane coupling agent (Si266) | 6.4 | — | — | — | — | — | — | — | 6.4 | — |
| Silane coupling agent (NXTZ45) | — | 4 | 4 | 1.6 | 9.6 | 6.4 | 6.4 | 6.4 | — | 6.4 |
| Aromatic vinyl polymer (SA85) | — | — | — | — | — | 2 | 5 | 15 | 15 | 30 |
| Mineral oil | 20 | 20 | 20 | 20 | 20 | 18.5 | 16.5 | 10 | 10 | — |
| Zinc oxide | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Age resistor | 2 | 2 | 2 | 2 | 2 | 2 | 2 | 2 | 2 | 2 |
| Wax | 2 | 2 | 2 | 2 | 2 | 2 | 2 | 2 | 2 | 2 |
| Sulfur | 1.8 | 1.8 | 1.8 | 1.8 | 1.8 | 1.8 | 1.8 | 1.8 | 1.8 | 1.8 |
| Vulcanization accelerator CZ | 2 | 2 | 2 | 2 | 2 | 2 | 2 | 2 | 2 | 2 |
| Vulcanization accelerator DPG | 1.5 | 1.5 | 1 | 1 | 1 | 1 | 1 | 1 | 1.5 | 1 |
| Mooney viscosity index | 100 | 100 | 110 | 95 | 115 | 110 | 110 | 105 | 90 | 110 |
| Scorch time index | 100 | 50 | 100 | 120 | 40 | 100 | 100 | 100 | 100 | 100 |
| Rolling resistance index | 100 | 100 | 90 | 110 | 85 | 90 | 92 | 98 | 105 | 105 |
| Wet skid performance index | 100 | 100 | 100 | 105 | 100 | 100 | 105 | 112 | 112 | 120 |
| Abrasion resistance index | 100 | 100 | 100 | 95 | 80 | 100 | 100 | 103 | 103 | 100 |
| Handling stability index | 100 | 100 | 95 | 95 | 90 | 100 | 105 | 105 | 100 | 95 |

Table 1 shows that processability, rolling resistance, wet skid performance, abrasion resistance, and handling stability were improved in good balance in Examples in which the silica-containing composition further contained both the aromatic vinyl polymer in a predetermined amount and the mercapto group-containing silane coupling agent. In contrast, in Comparative Examples in which the aromatic vinyl polymer and the specific silane coupling agent were not used together, or the aromatic vinyl polymer was used in too small or too large an amount, performances of the rubber composition were inferior on the whole.

The invention claimed is:

1. A rubber composition for a tread, comprising:
a rubber component;
an aromatic vinyl polymer;
silica; and
a mercapto group-containing silane coupling agent,
wherein the aromatic vinyl polymer is a copolymer of α-methylstyrene and styrene, and
the mercapto group-containing silane coupling agent is a copolymer comprising units A represented by formula (1) and units B represented by formula (2), and the proportion of the units B is 1 to 70 mol % of the total molar amount of the units A and the units B:

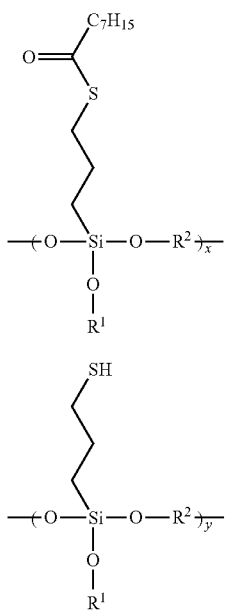

wherein x and y each are an integer of one or more,
$R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing the end of the alkyl or alkenyl group with a hydroxy or carboxyl group,
$R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and
$R^1$ and $R^2$ may form a ring structure together, and
the amount of the aromatic vinyl polymer is 3 to 25 parts by mass, and the amount of the silica is 15 to 150 parts by mass, based on 100 parts by mass of the rubber component.

2. The rubber composition for a tread according to claim 1, wherein the aromatic vinyl polymer has a softening point of 100° C. or lower.

3. The rubber composition for a tread according to claim 1, wherein the rubber component comprises a styrene butadiene rubber and/or a butadiene rubber.

4. A pneumatic tire having a tread produced from the rubber composition according to claim 1.

5. The rubber composition for a tread according to claim 1,
wherein the amount of the mercapto group-containing silane coupling agent is 1.5 to 20 parts by mass, based on 100 parts by mass of the silica.

6. The rubber composition for a tread according to claim 1,
wherein the amount of a carbon black is 3 to 100 parts by mass, based on 100 parts by mass of the rubber component.

7. The rubber composition for a tread according to claim 3,
wherein, in 100% by mass of the rubber component, the amount of the styrene butadiene rubber is 10% by mass or more, and the amount of the butadiene rubber is 10% by mass or more.

8. The rubber composition for a tread according to claim 1, wherein the rubber component comprises a styrene butadiene rubber having a styrene content of 5-60% by mass.

* * * * *